UNITED STATES PATENT OFFICE.

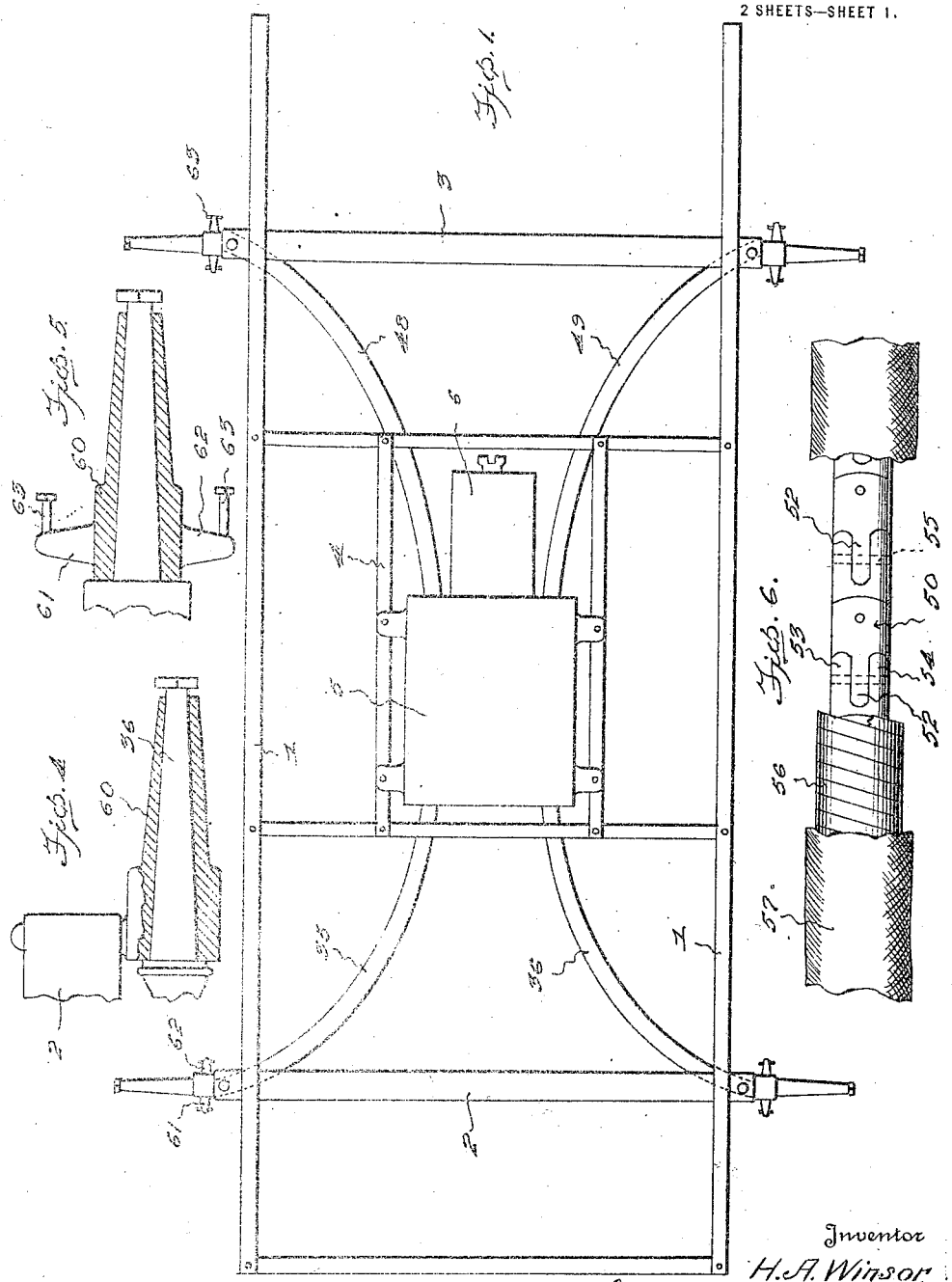

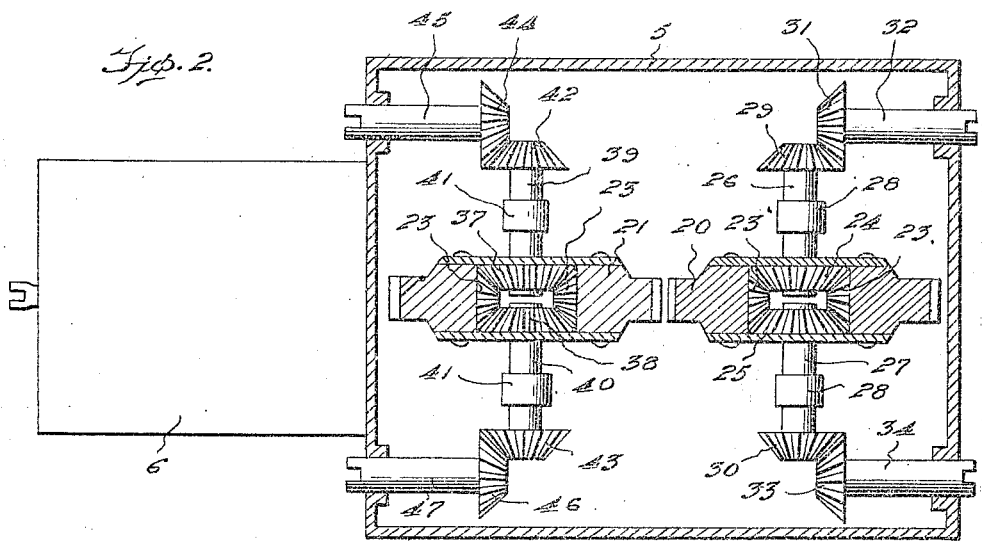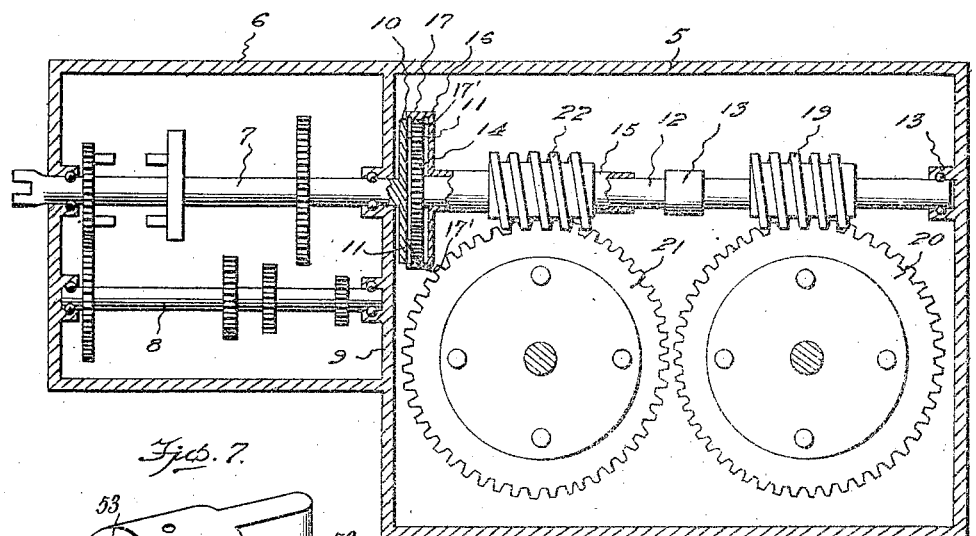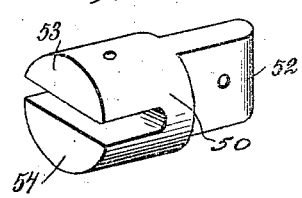

HENRY A. WINSOR, OF LOS ANGELES, CALIFORNIA.

MOTOR-VEHICLE.

1,198,983.   Specification of Letters Patent.   Patented Sept. 19, 1916.

Application filed June 5, 1915. Serial No. 32,393.

*To all whom it may concern:*

Be it known that I, HENRY A. WINSOR, a citizen of the United States, residing at Los Angeles, in the county of Los Angeles and State of California, have invented certain new and useful Improvements in Motor-Vehicles; and I do hereby declare the following to be a full, clear, and exact description of the invention, such as will enable others skilled in the art to which it appertains to make and use the same.

This invention relates to motor vehicles, and the primary object of the invention is to provide a novel form of mechanism for driving all four wheels of the vehicle, for increasing the power of the same.

Another object of this invention is to provide a mechanism as specified, which includes means for positively driving all four of the wheels of the vehicle, by means of flexible shafts, which are in turn driven by a novel form of gearing operatively connected to the ordinary type of selective speed shifting gears, and also to provide means for equally distributing the power to each of the wheels of the vehicle.

Another object of this invention is to provide a device as specified, which is comparatively simple in construction and will provide suitable transmissions of power, with utilization of a minimum number of parts, thereby decreasing the amount of lost motion through friction, and further to provide protective housings for preventing the entrance or accumulation of dust, dirt or the like upon the working parts of the invention.

With the foregoing and other objects in view this invention consists in such novel features of construction, combination and arrangement of parts as will be hereinafter more fully described, illustrated in the accompanying drawings and claimed.

In describing the invention in detail reference will be had to the accompanying drawings wherein like characters designate like or corresponding parts throughout the several views, and in which:—

Figure 1 is a plan view of the chassis of a motor vehicle, constructed in accordance with this invention, Fig. 2 is a top plan view of the distributing gears, showing parts thereof in section, Fig. 3 is a side elevation of the power distributing gear, showing parts thereof broken away, Fig. 4 is a vertical section through the spindle used in the construction of the motor vehicle, Fig. 5 is a top plan view of the spindle, showing parts thereof in horizontal section, Fig. 6 is a detail plan of the flexible shafting, and Fig. 7 is a perspective view of one of the links of the shafting.

Referring more particularly to the drawings, 1 designates the chassis of the motor vehicle, which has front and rear axles 2 and 3 supported thereby, and an auxiliary supporting structure 4 positioned intermediate of the axles 2 and 3. The supporting structure 4 supports a housing 5, which is secured to the supporting structure in any suitable manner, and has a second housing 6 formed thereon and projecting outwardly from one end of the housing 5. The housing 6 forms an inclosure for a speed selective sliding gear structure of the ordinary type, which includes a shaft 7, which is operatively connected to the motor or prime mover, (not shown) of the motor vehicle, and which has gear connection with the auxiliary shaft 8, upon which the speed gears are mounted. The construction of this gearing is of the ordinary type used in connection with various types of motor vehicles. The shaft 7 protrudes through the wall 9, which divides the housings 5 and 6, and it has a disk 10 formed upon its end which projects into the housing 5. The disk 10 has a plurality of pinions 11 supported thereby and projecting inwardly from the inner face of the disk.

A shaft 12 is supported within the housing 5 by suitable bearing structures 13, and it has a gear 14 mounted upon its end facing the disk 10, which gear meshes with the pinions 11, internally thereof, as is clearly shown in Fig. 3 of the drawings. The shaft 12 has a tubular shaft 15 mounted thereupon, which has a shell 16 mounted upon its end facing the partition 9. The shell 16 has a transversely extending side wall 17, which is provided with internal gear teeth 17', that mesh with the pinions 11, whereby the sleeve or tubular shaft 15 is rotated by the rotation of the guide shaft 7.

The shaft 12 has a worm 19 mounted thereon, which meshes with a worm gear 20. The worm gear 20 is positioned along side of a second worm gear 21, as is clearly shown in Figs. 2 and 3 of the drawings. The teeth of the worm gear 21 mesh with a worm 22, which is mounted upon the tubular shaft 15. By the provision of the two worms 19 and 22, and the worm gears 20 and 21, the collar as well as the disk and gear 14 and shell 16, the power of the engine is equally distributed to each of the gears 20 and 21. The gears 20 and 21 are hollow, and they have beveled gears 23 positioned therein. The beveled gears 23, which are positioned within the gear 20, mesh with beveled gears 24 and 25, which are positioned within the gear 20, and are mounted upon stub shafts 26 and 27 respectively. The shafts 26 and 27 are supported by suitable bearings 28, and they have beveled gears 29 and 30 mounted upon their outer ends respectively. The beveled gear 29 meshes with the beveled gear 31, which is mounted upon a shaft 32, while the beveled gear 30 meshes with a beveled gear 33, which is mounted upon a shaft 34. The shafts 32 and 34 are connected to the flexible shafts 35 and 36, which extend therefrom and are in turn connected to the wheels of the motor vehicle in the manner which will be hereinafter more fully described. The beveled gears 23, which are carried by the worm gear 21, mesh with beveled gears 37 and 38, which are mounted upon shafts 39 and 40 respectively. The shafts 39 and 40 are supported by suitable bearings indicated at 41, and they have beveled gears 42 and 43 mounted upon their outer ends. The beveled gear 42 meshes with a beveled gear 44 carried by a shaft 45, while the gear 43 meshes with a beveled gear 46, which is carried by a shaft 47. The shafts 45 and 47 project out of the sides of the housing 5, and they are operatively connected to the flexible shafts 48 and 49.

The flexible shafts 35, 36, 48 and 49 are composed of a plurality of links 50, a perspective view of one of which is illustrated in Fig. 7 of the drawings. The links 50 have body portions 51, from one end of which project tongues 52. The opposite ends of the body portions of the links from the ones upon which the tongues 52 are formed, are milled to form spaced tongues 53 and 54, which receive the tongues 52 of the link 50 next thereto, therebetween. The tongues 52 and 53 and 54 are pivotally connected, by means of pins indicated at 55. The links which are circular in cross section, have a flat spring wound thereabout for supporting the chains and preventing short kinks from forming within the flexible shaft. The spiral springs, which are wound about the various links 50, have a flexible tube indicated at 57 positioned thereabout, for retaining lubricant therein and preventing dust from engaging the links.

The flexible shafts 35, 36, 48 and 49 extend outwardly from the shafts 45, 47, 32 and 34, and through the hollow spindles 60 which are pivotally supported beneath the axles 2 and 3. The spindles 60 are hollow, and the flexible shafts extend entirely throughout the length of the spindles and are connected in any suitable manner to the hubs of the wheels of the vehicle, (not shown), for rotating the wheels by the rotation of the respective flexible shafts. The spindles 60 have arms 61 and 62 projecting outwardly therefrom and positioned in a horizontal plane. The arms 61 and 62 have pins 63 carried by their outer ends, to which an ordinary type of internal brake mechanism is attached, for arresting the rotation of the wheels.

The power of the prime mover or engine of the motor vehicle is transmitted, through the shaft 7, and the shaft 12 and tubular shaft 15, to the worm gears 20 and 21. The rotation of the worm gears 20 and 21, will rotate the shafts 26, 27, 39 and 40, which will in turn rotate the shafts 32, 34, 45 and 47, for rotating the flexible shafts 35, 36, 48 and 49. The flexible shafts will in turn rotate the four supporting wheels of the motor vehicle, and provide the necessary power for propelling the vehicle.

By the provision of the uniform sized beveled gears, for transmitting the power, the power will be evenly distributed, to the four wheels, and also by the positive drive of the two worm gears 21 and 22, through their meshing engagement with the worms 19 and 22, which are driven by the gears 11 in the manner heretofore described.

From the foregoing description taken in connection with the accompanying drawings the advantages of construction and of the method of operation of the improved motor vehicle will be readily apparent to those skilled in the art to which this invention appertains and, while in the foregoing description, the principle of the operation of this invention has been described together with various features of construction, it is to be understood that certain minor features of construction, combination and arrangement of parts may be altered to suit practical conditions provided such alterations are comprehended within the scope of what is claimed.

What is claimed is:—

1. In a motor vehicle structure, the combination with a chassis, having supporting wheel carrying spindles carried thereby, of a pair of worm gears, an operating shaft, a worm mounted upon said operating shaft and meshing with one of said pair of worm gears, a tubular shaft mounted upon said first named shaft, a worm mounted upon said tubular shaft, means adapted for operatively connecting said tubular shaft to a prime mover for equally distributing the power generated by a prime mover to said worm gears, and flexible shafts operatively connected to said worm gears and said spindles.

2. In a motor vehicle structure, the combination with a chassis, having supporting wheel carrying spindles carried thereby, of a pair of worm gears, a shaft, a worm mounted upon said shaft and meshing with one of said worm gears, a tubular shaft mounted upon said first named shaft for independent rotation thereof, a worm mounted upon said tubular shaft and meshing with the other of said pair of worm gears, means adapted for operatively connecting said shaft and said tubular shaft to a prime mover for equally distributing the power generated by a prime mover to each of said worm gears, a plurality of stub shafts operatively connected to said worm gears for rotation thereby, and a plurality of flexible shafts operatively connected to said stub shafts and said supporting wheels for equally distributing power from said worm gears to said spindles.

3. In a power transmitting structure for motor vehicles, a pair of rotatably supported worm gears, an operating shaft, a worm mounted upon said operating shaft and meshing with one of said pair of worm gears, a tubular shaft loosely mounted upon said operating shaft, a worm mounted upon said tubular shaft and meshing with the other of said pair of worm gears, a shell formed upon one end of said tubular shaft, internal gear teeth formed within said shell, a second operating shaft, a disk carried by said second operating shaft, a pair of pinions carried by said disk and meshing with said shell carried internal gear teeth, and a gear carried by said first operating shaft and meshing with said pinions.

4. In a power transmitting structure for motor vehicles, a pair of rotatably supported worm gears, an operating shaft, a worm mounted upon said operating shaft and meshing with one of said worm gears, a tubular shaft loosely mounted upon said operating shaft, a worm mounted upon said tubular shaft and meshing with the other of said pair of worm gears, a shell formed upon one end of said tubular shaft, internal gear teeth formed upon said shell, a second operating shaft, a disk carried by said second operating shaft, a pair of pinions carried by said disk and meshing with said shell carried internal gear teeth, a gear carried by said first named operating shaft and meshing with said pinions, shafts extending into said worm gears, bevel gears mounted upon said shafts interiorly of said worm gears, bevel gears carried by said worm gears and meshing with said shaft carried bevel gears for rotating said shafts upon rotation of said worm gears, and means operatively connected to said shafts for transmitting rotation therefrom to the wheels of a motor vehicle.

In testimony whereof I affix my signature in presence of two witnesses.

HENRY A. WINSOR.

Witnesses:
 JAMES B. BRITTON,
 JAY W. DONHAM.